(12) United States Patent
Zierer et al.

(10) Patent No.: US 6,262,224 B1
(45) Date of Patent: Jul. 17, 2001

(54) RAPID OXIDATION OF POLYARYLENE SULFIDE FIBER MATERIAL

(75) Inventors: Dirk Zierer, Hofheim; Martin Brück, Weilrod; Helmut Scheckenbach, Langen, all of (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 09/548,065

(22) Filed: Apr. 12, 2000

(30) Foreign Application Priority Data

Apr. 12, 1999 (DE) .............................................. 199 16 468

(51) Int. Cl.$^7$ ..................................................... C08G 75/14
(52) U.S. Cl. .......................... 528/388; 528/373; 528/480; 528/486; 528/502 R; 528/503
(58) Field of Search ..................................... 528/373, 388, 528/480, 503, 486, 562 R

(56) References Cited

U.S. PATENT DOCUMENTS 5,496,916  3/1996  Fleisher et al. ...................... 528/373
5,891,988  6/1999  Scheckenbach et al. ............ 528/373

FOREIGN PATENT DOCUMENTS 0 283 520  9/1988  (EP) .
0 623 641  11/1994  (EP) .
0 827 977  3/1998  (EP) .

*Primary Examiner*—Duc Truong
(74) *Attorney, Agent, or Firm*—Connolly Bove Lodge & Hutz LLP

(57) ABSTRACT

Polyaryiene sulfone fiber material, especially web, is obtained by oxidizing polyarylene sulfide fiber material with a peracid/acid mixture of an organic acid at 60 to 100° C. for 10 seconds to 45 minutes. Since this process provides a substantative degree of oxidation within a very short reaction time, one advantage of the process is that the rapidity of the oxidation renders continuous processes for oxidizing polyarylene sulfide fibers economical.

13 Claims, No Drawings

RAPID OXIDATION OF POLYARYLENE SULFIDE FIBER MATERIAL

This invention relates to a process for producing polyarylene sulfone fiber material by oxidizing polyarylene sulfide fiber material with a peracid/acid mixture of an organic acid.

Polyarylene sulfones are particularly notable for their chemical resistance and thermal and mechanical stability. They are therefore predominantly used as thermally stable filling and reinforcing materials in other engineering plastics. It is even possible to sinter polyarylene sulfones to obtain high temperature resistant products.

Polyarylene sulfones are obtained by oxidation of polyarylene sulfides. The product obtained is generally not further processable thermoplastically. This means that the physical form (powder, fiber, molding, etc.) of the oxidized product essentially depends on the physical form of the polyarylene sulfide used for oxidation. To produce polyarylene sulfone fiber material it is thus necessary to oxidize polyarylene sulfide fiber material.

EP-B-0283520 discloses polyphenylene sulfone fibers and a process for producing them by oxidizing polyarylene sulfide fibers. The polyphenylene sulfide fibers treated have a degree of orientation of not less than 60% and at least 90 mol % of their structural units are phenylene sulfide units and they are treated with an organic peroxide, for example peracetic acid. The disadvantage with this process is that only substantially oriented fibers having a high crystalline fraction can be oxidized.

EP-B-0283520 discloses in particular the oxidation of composite fibers from poly(p-phenylene sulfide) (PPPS) and polystyrene including the oxidation of fiber webs. This oxidation is carried out at 30° C. (room temperature) or 50° C. for 1 to 3 hours. Pure PPPS fibers were oxidized at 30° C. for two weeks to obtain fibers containing 75 mol % of sulfone groups, 16 mol % of sulfoxide groups and 9 mol % of remaining sulfide groups. The long reaction times are a disadvantage here.

The use of a hydrogen peroxide/acetic acid mixture for oxidizing aromatic polythioethers containing sulfone groups is described in Chimia 28, 567 (1974). However, this method presupposes the use of large amounts of suspension medium and of high temperatures. This method too has the disadvantage of long reaction times of up to 24 hours.

EP-A-0 623 641 discloses oxidizing PPS powder with peracetic acid (acetic acid+$H_2O_2$)—selectively in the presence of catalytic amounts of sulfuric acid—to obtain a pure polyarylene sulfone or a polyarylene sulfoxide sulfone copolymer where the sulfone units predominate in number. The long reaction times of 1–3 hours are a disadvantage.

A process for producing polyarylene sulfones by oxidizing polyarylene sulfides in acetic acid with hydrogen peroxide in the presence of catalytic amounts of sulfuric acid or organic equilibrium peracid is also described in DE-A-43 14 738. This process has the disadvantage that the reaction temperature fluctuates wildly during the addition of the hydrogen peroxide.

EP A 0 827 977 discloses that the temperature in the reaction mixture of the production of polyarylene sulfones by oxidation of polyarylene sulfides with hydrogen peroxide or peracids can easily be kept constant under reduced pressure, so that the liquid reaction medium, for example the solvent, boils. The disadvantage here is the fact that this process can only be carried out in a sealed vessel and hence not continuously.

It is an object of the present invention to develop a process whereby polyarylene sulfide fiber material can be oxidized economically and without technical problems.

It was found that, surprisingly, oxidation of polyarylene sulfide fiber material with an organic peracid/acid mixture at 60 to 100° C. will provide a very high degree of oxidation after just a very short reaction time.

The invention accordingly provides a process for producing polyarylene sulfone fiber material by oxidizing polyarylene sulfide fiber material with a peracid/acid mixture of an organic acid, which comprises effecting said oxidizing at 60 to 100° C. for 10 seconds to 45 minutes.

The particular advantage of the process of the invention is that the rapidity of the oxidation renders continuous processes for oxidizing polyarylene sulfide fibers economical.

Polyarylene sulfides in the broadest sense are linear, branched or crosslinked polymers that contain arylene sulfide units. Polyarylene sulfides and their synthesis are described, for example in "Ullmann's Encyclopedia of Industrial Chemistry", Volume A21, B. Eivers, S. Hawkins and G. Schulz (Eds.), VCH, Weinheim-New York 1992, p. 463–472, incorporated herein by reference. Preferred polyaryiene sulfides are polyarylene thioethers containing repeat units of the formula

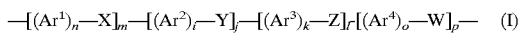

where $Ar^1$, $Ar^2$, $Ar^3$, $Ar^4$ on the one hand and W, X, Y and Z on the other are independently identical or different, the indices n, m, i, j, k, l, o and p are independently zero or 1, 2, 3 or 4, subject to the proviso that their sum total is not less than 2, $Ar^1$, $Ar^2$, $Ar^3$ and $Ar^4$ are arylene units of 6 to 18 carbon atoms, W, X, Y and Z are bivalent linking groups selected from —$SO_2$—, —S—, —SO—, —CO—, —O—, —COO— or alkylene or alkylidene groups of 1 to 6 carbon atoms, and at least one of the linking groups W, X, Y or Z is —S—. The arylene units $Ar^1$, $Ar^2$, $Ar^3$ and $Ar^4$ may be selectively substituted or unsubstituted.

Preferred arylene systems are phenylene, biphenylene, naphthylene, anthracene and phenanthrene. The polyarylene sulfide advantageously contains at least 30 mol %, preferably at least 50 mol %, particularly at least 70 mol %, of arylene sulfide units. The preferred polyarylene sulfide is polyphenylene sulfide. This generally contains at least 50 mol %, especially at least 70 mol %, of phenylene sulfide units and is known for example under the names of ®Fortron and ®Ryton.

By fiber material are generally meant all possible and conceivable materials that are fibrous or composed of fibers, for example individual fibers, fiber strands, networks, wovens, needlefelts, nonwovens, etc.

The process of the invention is particularly useful for fiber materials whose fibers have a filament diameter of 1 to 20 $\mu$m, preferably 2 to 10 $\mu$m, especially 3 to 6 $\mu$m. These fibers may have been produced, for example, in the melt-blown process. Other advantages are a fiber BET specific surface area of $\leq 0.3$ $m^2/g$ and a polyarylene sulfide crystallinity of less than 40%, especially within the range from 5 to 20%. Whereas the specific surface area of the oxidized product is substantially unchanged, the crystallinity is increased by the oxidation.

The advantages of the process of the invention are particularly apparent in the case of the oxidation of polyarylene sulfide fiber material produced by the process described in EP-A 0 709 499, wherein polyarylene sulfide is extruded together with specific organic phosphites or phosphonites and formed into microfibers by the melt-blown process. The disclosure content of EP-A 0 709 499 and its priorities U.S. Pat. No. 324,946 and U.S. Pat. No. 517,494 is hereby incorporated herein by reference.

The polyarylene sulfide fiber material may be oxidized according to the invention using, in general, mixtures of organic peracids and concentrated organic acids. The peracid may be formed in advance by mixing hydrogen peroxide and an acid or in situ by addition of hydrogen peroxide to concentrated organic acid. Organic acids are aromatic or aliphatic carboxylic acids, for example benzoic acid and acetic acid. If the acid is a liquid, it may be used as reaction medium. The acids may include water or be dissolved in water. An example of an organic peracid is peracetic acid.

Sulfuric acid is advantageously added to the organic acids to catalyze the reaction with hydrogen peroxide to form peracid. An exception is the reaction in formic acid. It does not require further activation by mineral acid.

The preferred oxidizing agent according to the invention is hydrogen peroxide in concentrated acetic acid, which may advantageously also include 0.1 to 10 percent by volume, especially 1 to 5 percent by volume, of sulfuric acid. Water-diluted acids may also be used. Hydrogen peroxide and acetic acid form peracetic acid to produce a peracetic acid/acetic acid mixture.

Hydrogen peroxide is generally used in the form of a 20 to 85% aqueous solution. However, more concentrated solutions or pure hydrogen peroxide may also be used. The peracid fraction in the peracid/acid mixture is generally 1 to 40% by weight, preferably 5 to 10% by weight, particularly preferably about 8% by weight, i.e., 7.5 to 8.5% by weight. The oxidation generally takes place at 60 to 100° C., preferably 60 to 80° C., and at 1 mbar to atmospheric pressure, advantageously at atmospheric pressure. The reaction time is generally 10 seconds to 45 minutes, preferably 30 seconds to 10 minutes, particularly preferably 30 seconds to 2 minutes. The oxidation essentially converts sulfide units (—S—) into sulfone units (—$SO_2$—). However, sulfoxide units may be formed as well. In general, no crosslinking occurs between polymer chains.

Polyarylene sulfone fiber materials are useful for example as thermally stable and chemically resistant reinforcing or filling materials in other high performance plastics. Particularly polyarylene sulfone webs are useful for reinforcing polyarylene sulfide molding compositions and molded articles and for producing filter materials for harsh environment filtration (HEF) and as insulation material, for example in aerospace.

EXAMPLES 1–6

A melt-blown polyphenylene sulfide fiber web (PPS web) composed of ®Fortron 0203 B6 and having a basis weight of 150 g/m² (Ticona GmbH, Frankfurt) was oxidized with a peracetic acid/acetic acid mixture. To this end, 100 ml of an 8% peracetic acid solution in glacial acetic acid were heated to 70° C. in a beaker. A piece of PPS web about 26 cm² in size and 0.400 g in weight was dipped into this reaction solution. The temperature rose rapidly to about 75° C. The reaction was discontinued after 1, 2, 5, 10, 15 and 30 minutes by removing the web and quenching in water. After thorough washing with completely ion-free water, the web pieces were dried overnight in a vacuum drying cabinet at 120° C. and weighed. The weight increase and the degree of oxidation in the polyphenylene sulfone fiber web ($PPSO_2$ web), determined via the oxygen/sulfur ratio of elemental analysis, are summarized in Table 1.

EXAMPLE 7

A somewhat larger piece of PPS web (weight 0.900 g) was oxidized with an $H_2O_2$/acetic acid mixture (peracetic acid formed in situ in the reaction vessel) for 6 hours. This run was intended to produce a completely through-oxidized piece of $PPSO_2$ web. The experimental data are recited in Table 1 as run number 7.

EXAMPLES 8–10 (COMPARATIVE)

Example 1 (1 minute oxidation) was repeated except that the starting material was heat-treated at 140° C. (No. 8), 100° C. (No. 9) or 90° C. (No. 10) for one hour prior to oxidation in order to obtain a higher crystallinity. The deterioration in oxidizability was signaled by the virtual disappearance of the exotherm of the reaction and the distinctly lower degrees of oxidation (Table 1).

The yields in Table 1 show that the conversion (calculated from the weight increase) is about 94.5% after a reaction time of just 2 minutes. The theoretical weight increase for a 100% oxidation of PPS (MW=108.16 g/mol) to $PPSO_2$ (MW=140.16 g/mol) is 29.6% (i.e., a 0.400 g PPS web will produce 0.518 g of $PPSO_2$ web). This value is actually achieved in run 7.

The BET specific surface area of the PPS web was determined using a Sorptomatic. A specific surface area of almost 1 m²/g was found. This value can be used to estimate the average filament diameter. A density of 1.35 g/cm³ for PPS corresponds to a diameter of 3 to 4 μm.

TABLE 1

Oxidation of PPS web (Fortron 0203 B6, 150 g/m²)

| No. | Weight | Oxidation medium | Reaction time | Yield | Degree of oxidation* |
|---|---|---|---|---|---|
| 1 | 0.4 g | AcOOH/AcOH (8% strength) | 1 min | 0.482 g (93.0%) | 82.7% |
| 2 | 0.4 g | AcOOH/AcOH (8% strength) | 2 min | 0.489 g (94.4%) | 87.0% |
| 3 | 0.4 g | AcOOH/AcOH (8% strength) | 5 min | 0.490 g (94.6%) | 87.6% |
| 4 | 0.4 g | AcOOH/AcOH (8% strength) | 10 min | 0.491 g (94.8%) | 87.7% |
| 5 | 0.4 g | AcOOH/AcOH (8% strength) | 15 min | 0.492 g (95.0%) | 89.0% |
| 6 | 0.4 g | AcOOH/AcOH (8% strength) | 30 min | 0.494 g (95.4%) | 91.5% |
| 7 | 0.9 g | $H_2O_2$/AcOH (0.25 mol/l) | 6 h | 1.17 g (100%) | 97.0% |
| 8 | 0.4 g | AcOOH/AcOH (8% strength) | 1 min | 0.403 g (77.8%) | 8.5% |
| 9 | 0.4 g | AcOOH/AcOH (8% strength) | 1 min | 0.404 g (78.0%) | 9.4% |
| 10 | 0.4 g | AcOOH/AcOH (8% strength) | 1 min | 0.408 g (78.8%) | 13.5% |

*calculated from the O:S ratio of elemental analysis

The web samples of Examples 1 to 7, which have been oxidized for different lengths of time, and the PPS web used were tested for thermal stability. To this end, a thermogravimetric analysis (TGA) was carried out in air (300 ml/min) from room temperature to 600° C. at a heating rate of 10 K/min. The results are summarized in Table 2.

TABLE 2

TG/DTA results of PPS and $PPSO_2$ webs in air at 10K/min.

| No. | Material | Oxidation time | Onset of decomposition | Combustion ($T_{exo}$) |
|---|---|---|---|---|
| 0 | PPS web | — | $T_m$ ≈ 280° C.* $T_Z$ > 450° C.# | — |

TABLE 2-continued

TG/DTA results of PPS and PPSO$_2$ webs in air at 10K/min.

| No. | Material | Oxidation time | Onset of decomposition | Combustion (T$_{exo}$) |
|---|---|---|---|---|
| 1 | PPSO$_2$ web | 1 min | 408° C. | 531° C. |
| 2 | PPSO$_2$ web | 2 min | 413° C. | 531° C. |
| 3 | PPSO$_2$ web | 5 min | 417° C. | 528° C. |
| 4 | PPSO$_2$ web | 10 min | 420.5° C. | 536° C. |
| 5 | PPSO$_2$ web | 15 min | 422.5° C. | 535° C. |
| 6 | PPSO$_2$ web | 30 min | 426° C. | 533° C. |
| 7 | PPSO$_2$ web | 6 h | 438° C. | 540° C. |

*melting point of web;
onset of weight loss.

The PPS web (starting material=sample 0) suffers visible weight loss in TGA at a higher temperature compared with the oxidized webs (samples 1–7), since the material melts beforehand (at about 280° C.) and the surface area is greatly reduced as a result. This is also shown by the autoignition of the PPSO$_2$ webs at about 530–540° C., which does not occur in that form in the case of the PPS web. The PPS web loses about 55% of its weight by 600° C. (leaving behind a black bead), whereas the PPSO$_2$ webs burn without leaving a residue.

A separate DSC measurement (from RT to 310° C. at 20 K/min under N$_2$, see FIG. 4a) was used to estimate the crystalline PPS fraction in the web from the enthalpy difference between melt peak (45 J/g) and cold crystallization peak (30 J/g). On the assumption that a 100% crystalline PPS has a melt enthalpy of 130 J/g, this corresponds to a crystalline fraction of 11.5% in the Fortron web used. This is in conformity with the results of x-ray diffractometry, according to which the crystalline fraction was too small to be detected, which means that the crystallinity is <15%. By contrast, a material which has been oxidized for 1 minute has a crystallinity of about 60%.

What is claimed is:

1. A process for producing polyarylene sulfone fiber material by oxidizing polyarylene sulfide fiber material with a peracid/acid mixture of an organic acid, which comprises effecting said oxidizing at 60 to 100° C. for 10 seconds to 30 minutes.

2. The process of claim 1, wherein the fibers in said polyarylene sulfide fiber material have a BET specific surface area of $\geq 0.3$ m$^2$/g.

3. The process of claim 1, wherein said fibers in said polyarylene sulfide fiber material have a filament diameter of 1 to 20 μm.

4. The process of claim 1, wherein said fibers in said polyarylene sulfide fiber material have a filament diameter of 2 to 10 μm.

5. The process of claim 1, wherein said fibers in said polyarylene sulfide fiber material have a filament diameter of 3 to 6 μm.

6. The process of claim 1, wherein the polyarylene sulfide in said polyarylene sulfide fiber material has a crystallinity of less than 40%.

7. The process of claim 1, wherein the polyarylene sulfide in said polyarylene sulfide fiber material has a crystallinity within the range from 5 to 20%.

8. The process of claim 1, wherein said oxidizing is effected using a peracetic acid/acetic acid mixture.

9. The process of claim 1, wherein not less than 80% of said polyarylene sulfide will have been oxidized after a reaction time of just one minute.

10. The process of claim 1 in continuous practice.

11. The process of claim 1, wherein said polyarylene sulfide fiber material used is a polarylene sulfide fiber web having a basis weight of about 150 g/m$^2$.

12. The process of claim 1 as a continuous process comprising a polyarylene sulfide fiber web being oxidized with a peracetic acid/acetic acid mixture in a dip bath and the resulting polyarylene sulfone fiber web then being transported through squeeze means into a wash bath, washed in the wash bath, again passed through squeeze means and finally dried.

13. The method of using polyarylene sulfone fiber material obtained by the process as claimed in claim 1 as filter material, especially for extreme conditions such as harsh environment filtration.

* * * * *

UNITED STATES PATENT AND TRADEMARK OFFICE
CERTIFICATE OF CORRECTION

PATENT NO. : 6,262,224 B1
DATED : July 17, 2001
INVENTOR(S) : Dirk Zierer, Martin Brück and Helmut Scheckenbach Page 1 of 1

It is certified that error appears in the above-identified patent and that said Letters Patent is hereby corrected as shown below:

ABSTRACT,
Line 1, first word, "Polyaryiene" should read as -- Polyarylene --.

Column 1,
Line 18, "Eivers" should read -- Elvers --.
Line 21, "polyaryiene" should read as -- polyarylene --.

Signed and Sealed this

Nineteenth Day of February, 2002

*Attest:*

*Attesting Officer*

JAMES E. ROGAN
*Director of the United States Patent and Trademark Office*